US011533962B2

(12) United States Patent
Benzien (10) Patent No.: US 11,533,962 B2
(45) Date of Patent: Dec. 27, 2022

(54) ARTICLE OF FOOTWEAR WITH UPPER AND SOLE STRUCTURE HAVING SUBSTANTIALLY EQUAL COEFFICIENTS OF FRICTION

(71) Applicant: NIKE, Inc., Beaverton, OR (US)

(72) Inventor: Richard August Benzien, Portland, OR (US)

(73) Assignee: NIKE, Inc., Beaverton, OR (US)

(*) Notice: Subject to any disclaimer, the term of this patent is extended or adjusted under 35 U.S.C. 154(b) by 153 days.

(21) Appl. No.: 17/011,271

(22) Filed: Sep. 3, 2020

(65) Prior Publication Data
US 2020/0397089 A1 Dec. 24, 2020

Related U.S. Application Data

(63) Continuation of application No. 16/116,013, filed on Aug. 29, 2018, now Pat. No. 10,806,207.
(Continued)

(51) Int. Cl.
*A43B 23/08* (2006.01)
*A43B 1/00* (2006.01)
(Continued)

(52) U.S. Cl.
CPC .......... *A43B 1/00* (2013.01); *A43B 1/10* (2013.01); *A43B 1/14* (2013.01); *A43B 5/00* (2013.01);
(Continued)

(58) Field of Classification Search
CPC .......... A43B 1/10; A43B 23/07; A43B 23/08; A43B 23/081; A43B 7/1495; A43B 23/04; A43B 23/042; A43C 5/00; A43C 1/04
(Continued)

(56) References Cited

U.S. PATENT DOCUMENTS

| 129,389 | A | * | 7/1872 | Glancy | A43B 3/16 36/76 R |
| 1,334,009 | A | * | 3/1920 | Archambeau | A43B 3/02 36/4 |

(Continued)

FOREIGN PATENT DOCUMENTS

| CN | 2452332 Y | 10/2001 |
| CN | 1960650 A | 5/2007 |

(Continued)

OTHER PUBLICATIONS

"ASTM F2913-11; Standard Test Method for Measuring the Coefficient of Friction for Evaluation of Slip Performance of Footwear and Test Surfaces/Flooring Using a Whole Shoe Tester", ASTM Designation, ASTM International, US, vol. F2913-11, Dec. 1, 2011 (Dec. 1, 2011), pp. 1091-1100.

*Primary Examiner* — Marie D Bays
(74) *Attorney, Agent, or Firm* — Quinn IP Law (57) ABSTRACT

An article of footwear comprises an upper and a sole structure secured to the upper. The upper includes a side portion that has a first material composition at an exterior surface of the side portion. The exterior surface has a first coefficient of friction. The sole structure has a second material composition at an exterior surface of the sole structure that underlies the side portion of the upper. The exterior surface of the sole structure has a second coefficient of friction. The first coefficient of friction is substantially equal to the second coefficient of friction.

17 Claims, 4 Drawing Sheets

Related U.S. Application Data (60) Provisional application No. 62/552,534, filed on Aug. 31, 2017.

(51) Int. Cl.

| | | |
|---|---|---|
| A43B 1/14 | (2006.01) | |
| A43B 23/04 | (2006.01) | |
| A43B 23/02 | (2006.01) | |
| A43B 7/08 | (2022.01) | |
| A43B 19/00 | (2006.01) | |
| A43B 13/04 | (2006.01) | |
| A43C 1/04 | (2006.01) | |
| A43B 5/00 | (2022.01) | |
| B32B 7/02 | (2019.01) | |
| B32B 7/12 | (2006.01) | |
| B32B 27/08 | (2006.01) | |
| A43B 1/10 | (2006.01) | |
| A43B 13/22 | (2006.01) | |

(52) U.S. Cl.
CPC .............. *A43B 7/08* (2013.01); *A43B 13/04* (2013.01); *A43B 13/22* (2013.01); *A43B 19/00* (2013.01); *A43B 23/0205* (2013.01); *A43B 23/026* (2013.01); *A43B 23/027* (2013.01); *A43B 23/0215* (2013.01); *A43B 23/0235* (2013.01); *A43B 23/0275* (2013.01); *A43B 23/042* (2013.01); *A43B 23/08* (2013.01); *A43C 1/04* (2013.01); *B32B 7/02* (2013.01); *B32B 7/12* (2013.01); *B32B 27/08* (2013.01); *B32B 2437/02* (2013.01)

(58) Field of Classification Search
USPC .............................................. 36/4, 50, 1, 7.3
See application file for complete search history.

(56) References Cited

U.S. PATENT DOCUMENTS

| | | | | |
|---|---|---|---|---|
| 1,518,062 | A * | 12/1924 | Glancy | B29D 35/00 450/156 |
| 2,108,656 | A * | 2/1938 | De Noronha | A43B 3/16 36/3 A |
| 2,229,387 | A * | 1/1941 | Parker | A43B 7/32 36/77 R |
| 2,426,211 | A * | 8/1947 | Heckman | A43B 3/02 36/77 R |
| 2,617,209 | A * | 11/1952 | Jackson | A43B 3/16 36/54 |
| 2,860,425 | A * | 11/1958 | Jackson | A43B 3/16 36/58.5 |
| 4,329,790 | A * | 5/1982 | Bell | A43B 3/16 36/4 |
| 4,366,629 | A * | 1/1983 | Scherz | A43B 7/32 36/76 R |
| 4,447,967 | A | 5/1984 | Zaino | |
| 5,499,459 | A * | 3/1996 | Tomaro | A43B 1/0045 36/55 |
| 5,802,740 | A * | 9/1998 | Merk, Sr. | A43B 7/125 36/83 |
| 7,234,251 | B2 * | 6/2007 | Fuerst | A43B 1/0027 36/77 R |
| 8,361,369 | B1 * | 1/2013 | Cook | B29D 35/0018 264/266 |
| 2003/0051375 | A1 * | 3/2003 | Chun-Ming | A43B 7/12 36/77 R |
| 2004/0074110 | A1 | 4/2004 | Borsoi | |
| 2009/0277041 | A1 * | 11/2009 | Hubner | A43B 3/02 36/77 R |
| 2012/0011744 | A1 | 1/2012 | Bell et al. | |
| 2013/0008053 | A1 | 1/2013 | Nishiwaki et al. | |
| 2013/0133229 | A1 * | 5/2013 | Ludemann | A43B 23/081 12/146 B |
| 2013/0219749 | A1 * | 8/2013 | Dojan | A43B 13/04 36/83 |
| 2014/0196310 | A1 * | 7/2014 | Beye | A43B 23/0215 428/174 |
| 2015/0089841 | A1 | 4/2015 | Smaldone et al. | |
| 2015/0189952 | A1 | 7/2015 | Liang | |
| 2017/0208900 | A1 | 7/2017 | Boucher et al. | |
| 2017/0238659 | A1 * | 8/2017 | Bohnsack | A43D 3/10 |
| 2019/0059502 | A1 * | 2/2019 | Benzien | B32B 7/12 |

FOREIGN PATENT DOCUMENTS

| | | |
|---|---|---|
| CN | 101076266 A | 11/2007 |
| CN | 101677649 A | 3/2010 |
| CN | 103619204 A | 3/2014 |
| CN | 203828164 U | 9/2014 |
| CN | 204317632 U | 5/2015 |
| CN | 105578917 A | 5/2016 |
| CN | 205456487 U | 8/2016 |
| CN | 106820412 A | 6/2017 |
| CN | 107006948 A | 8/2017 |
| EP | 3199048 A1 | 8/2017 |
| WO | 2016170030 A1 | 10/2016 |

* cited by examiner

ARTICLE OF FOOTWEAR WITH UPPER AND SOLE STRUCTURE HAVING SUBSTANTIALLY EQUAL COEFFICIENTS OF FRICTION

CROSS-REFERENCE TO RELATED APPLICATIONS

This application is a continuation of United Stated Non-provisional application Ser. No. 16/116,013 filed Aug. 29, 2018, which claims the benefit of priority to U.S. Provisional Application No. 62/552,534, filed Aug. 31, 2017, and both of which are hereby incorporated by reference in their entirety.

TECHNICAL FIELD

The present teachings generally include an article of footwear having an upper and a sole structure that have different material compositions but substantially equal coefficients of friction.

BACKGROUND

The various components of an article of footwear serve different functions. Accordingly, different footwear components are often made of different materials best suited for their different functions. The effectiveness of footwear used for skateboarding is dependent of the sometimes competing goals of flexibility, energy absorption, fit, durability, and grip. Flexible footwear enhances the wearer's ability to quickly sense and adjust the position of his or her feet as desired on the skateboard. Energy absorption limits the transfer of high impact loads to the foot. Fit ensures that the footwear doesn't move relative to the foot during use so that control of the skateboard via movements of the foot is most accurately conveyed to the skateboard. Durability is important due to frequent contact of the footwear with the abrasive surfaces of the skateboard and with concrete. Grip is desirable to enhance the wearer's ability to control the skateboard with his or her feet.

BRIEF DESCRIPTION OF THE DRAWINGS

The drawings described herein are for illustrative purposes only, are schematic in nature, and are intended to be exemplary rather than to limit the scope of the disclosure.

DESCRIPTION

An article of footwear particularly suited for controlling an object in contact with an exterior surface of the article of footwear has an upper and a sole structure of different material compositions but substantially equal coefficients of friction. The article of footwear may enhance a wearer's ability to control an object in contact with the article of footwear as a frictional force exerted by the wearer via the article of footwear will be somewhat independent of the location of contact of the object (i.e., will be the same if the location is the upper or the sole structure).

An article of footwear comprises an upper and a sole structure secured to the upper. The upper includes a side portion that has a first material composition at an exterior surface of the side portion. The exterior surface has a first coefficient of friction. The sole structure has a second material composition at an exterior surface of the sole structure that underlies the side portion of the upper. The exterior surface of the sole structure has a second coefficient of friction. The first coefficient of friction is substantially equal to the second coefficient of friction. Accordingly, surface contact with the exterior portion of the side portion of the upper will provide substantially the same grip and feel as surface contact with the exterior portion of the sole structure. Motions in which an object is contacted with the exterior surface of the side portion of the upper followed by contact with the exterior surface of the sole structure, or vice versa, can provide identical grip on the object in both phases, allowing movement to be made seamlessly between the two surfaces. The object may be any object to be controlled by the footwear 10, such as a skateboard or a ball. For example, control of the object may be improved due to the nearly identical frictional forces that may result regardless of whether the skateboard is in contact with the side surface of the upper or is in contact with the sole structure. Such control may be achieved even though the upper and the sole structure have different material compositions as may be desirable in order to achieve their respective functions, such as comfort and ventilation of the upper and cushioning and durability of the sole structure. For example, the upper may have at least one of eyelet openings or ventilation openings. The first material composition may include rubber, such as natural rubber or synthetic rubber, but is not limited to such. The second material composition may include polymeric foam but is not limited to such. Non-limiting examples of materials from which the first material composition and the second material composition may be selected include rubber, a polymeric foam, silicone, thermoplastic polyurethane, polypropylene, polyethylene, ethylvinvlyacetate, and styrene ethylbutylene styrene, for example, and combinations of such, with the first material composition and the second material composition being different, however.

In one or more embodiments, the sole structure has a side wall, and the exterior surface of the sole structure is at the side wall. In such embodiments, the sole structure has a bottom with a bottom surface. The bottom surface may be contiguous with the exterior surface of the side wall and may also have the second coefficient of friction.

In one or more embodiments, the upper may include an outer layer and an inner layer. The outer layer may include the side portion with the exterior surface. The inner layer may be bonded to an inner surface of the outer layer. The inner layer may have a third material composition that is softer than the first material composition. For example, the inner layer may be a textile, while the outer layer may be rubber.

In one or more embodiments, the upper includes both an outer unit and an inner unit. The outer unit has a forefoot region, a midfoot region, a heel region, and includes the side portion with the exterior surface. The outer unit is a one-piece, unitary component. In such embodiments, the upper may include an inner unit disposed inward of the outer unit and defining a foot-receiving cavity. The outer unit may be securable around the foot-receiving cavity separately from the inner unit. For example, the inner unit may be a sock configuration that secures around the foot when the foot is inserted therein, while the outer unit may have eyelet openings for one or more laces, or may have other fastening mechanisms to secure the outer unit around the foot.

In one or more embodiments, the article of footwear further comprises tensioning cables secured to the sole structure and disposed between the outer unit and the inner unit. The outer unit has eyelet openings, and the tensioning cables form loops remote from the sole structure. The loops are configured to be disposed adjacent to the eyelet openings. For example, a lace may be inserted through the eyelet openings while also passing through the loops so that tightening the lace will simultaneously tighten the outer unit around the foot and tighten the tensioning cables around the foot.

In one or more embodiments, the upper has a forefoot region that has a toe box region and a vamp region contiguous with the toe box region. The toe box region is adjacent to the sole structure and between the sole structure and the vamp region. The toe box region has a first thickness, and the vamp region has a second thickness less than the first thickness. Accordingly, the toe box region is sufficiently thick to support and protect the front and sides of the toes of a foot inserted in the foot-receiving cavity of the upper, while the vamp region is sufficiently thin to encourage flexing, and is well suited for ventilation openings.

In one or more embodiments, a boundary between the vamp region and the toe box region extends around the forefoot region of the upper from a medial side of the upper to a lateral side of the upper. The upper may flex at a boundary between the vamp region and the toe box region under a force applied to a bottom surface of the sole structure.

In one or more embodiments, the toe box region and the vamp region are both of the first material composition. The exterior surface of the side portion in the toe box region having the first coefficient of friction is contiguous with an exterior surface of the vamp region, and the exterior surface of the vamp region also has the first coefficient of friction.

Within the scope of the present disclosure, an article of footwear comprises an upper including a one-piece, unitary outer unit that has a forefoot region, a midfoot region, and a heel region. The outer unit is comprised of rubber and has a side portion with an exterior surface that has a first coefficient of friction. The article of footwear further comprises a sole structure secured to the upper. The sole structure is comprised of polymeric foam and has an exterior surface that has a second coefficient of friction and that underlies the exterior surface of the side portion of the outer unit. The first coefficient of friction is substantially equal to the second coefficient of friction. The forefoot region of the outer unit has a toe box region and a vamp region. The toe box region is adjacent to the sole structure and between the sole structure and the vamp region. The toe box region has a first thickness, and the vamp region has a second thickness less than the first thickness.

In one or more embodiments, the outer unit has at least one of eyelet openings or ventilation openings.

In one or more embodiments, a boundary between the vamp region and the toe box region extends around the forefoot region of the outer unit from a medial side of the outer unit to a lateral side of the outer unit. The upper flexes at the boundary under a force applied to a bottom surface of the sole structure due to the reduction of thickness at the boundary.

In one or more embodiments, the outer unit includes an outer layer and an inner layer. The inner layer is bonded to an inner surface of the outer layer. The outer layer includes the side portion and the exterior surface. The inner layer comprises a textile.

In one or more embodiments, the article of footwear further comprises a bootie disposed inward of the outer unit. The bootie defines a foot-receiving cavity. The outer unit is securable around the foot-receiving cavity separately from the bootie.

In one or more embodiments, the article of footwear further comprises tensioning cables secured to the sole structure and disposed between the outer unit and the bootie. The outer unit has eyelet openings. The tensioning cables form loops remote from the sole structure. The loops are configured to be disposed adjacent to the eyelet openings.

The above features and advantages and other features and advantages of the present teachings are readily apparent from the following detailed description of the modes for carrying out the present teachings when taken in connection with the accompanying drawings.

Figure 1:
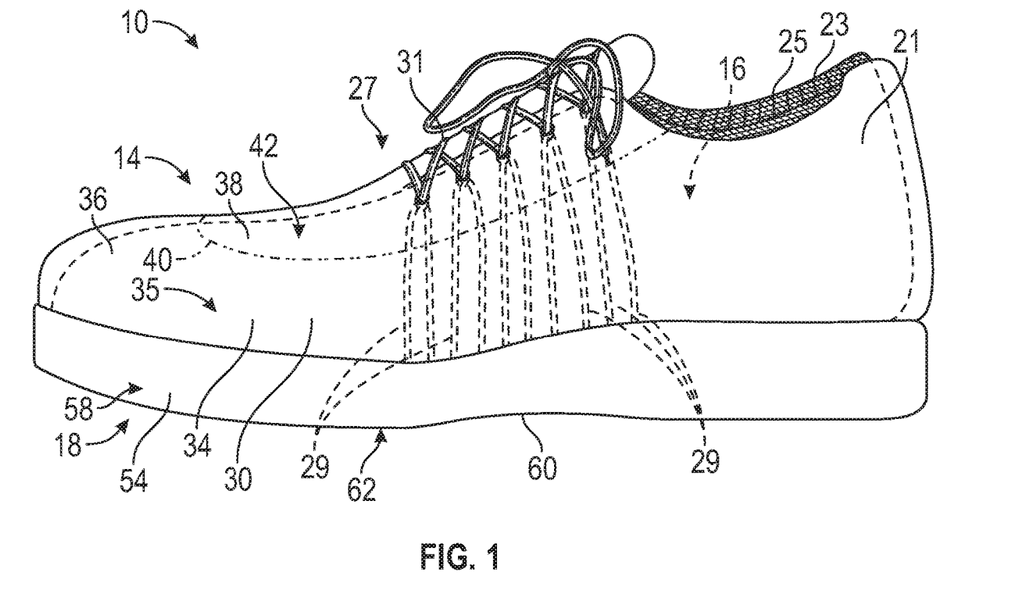
FIG. 1 is a schematic illustration in medial side view of an article of footwear having an upper and a sole structure.

Referring to the drawings, wherein like reference numbers refer to like components throughout the views, FIG. 1 shows a medial side view of an article of footwear 10. The article of footwear 10 includes an upper 14 and a sole structure 18 secured to the upper 14. The upper 14 and the sole structure 18 together define a foot-receiving cavity 16. The sole structure underlies the upper 14 and a foot 19 disposed in a foot-receiving cavity 16 (foot 19 shown in phantom in FIGS. 8 and 9). As further described herein, the upper 14 and sole structure 18 have exterior surfaces of different material compositions that nevertheless provide coefficients of friction that are substantially equal so that surface contact with the exterior portion of the side portion of the upper 14 will provide the same grip and feel as surface contact with the exterior portion of the sole structure 18.

Referring to FIG. 1, the article of footwear 10 includes a sole structure 18 that underlies the upper 14. The sole structure 18 is shown as a single, one-piece, unitary midsole and outsole, but the sole structure 18 of the article of footwear 10 may have any configuration within the scope of the present teachings. For example, the sole structure 18 may include one or more sole components that may be separate sole layers, such as an outsole and one or more midsole layers. In further configurations, the sole structure 18 may incorporate fluid-filled chambers, plates, moderators, or other elements that further attenuate forces, enhance stability, or influence the motions of the foot. In one non-limiting example, the sole structure 18 as shown as a unitary midsole and outsole and may be formed from a compressible polymeric foam (e.g., a polyurethane or ethylvinylacetate foam) that attenuates reaction forces (i.e., provides cushioning) when compressed between the foot and an object such as a skateboard or the ground during walking, running, or other ambulatory activities.

The upper 14 is secured to the sole structure 18. For example, a lower extremity of the upper 14 may be bonded or otherwise secured to the sole structure 18. A strobel (not shown) may be secured to the lower extremity of the upper 14 and to the sole structure 18. An insole (not shown) may overlie the sole structure 18 within the foot-receiving cavity 16. As further described herein, the upper 14 has an outer unit 21 and an inner unit 23. The outer unit 21 is a one-piece, unitary component. The inner unit 23 is interior to the outer unit 21 and has a sock configuration, and is also referred to herein as a bootie. A foot 19 is inserted into the inner unit 23 at an ankle opening 25, and the inner unit 23 stretches to accommodate and conform to the foot 19. The outer unit 21 is then separately securable to the foot 19 via a lacing system 27 that includes tensioning cables 29 and a lace 31.

The upper 14 is configured to receive and retain the foot 19 in the foot-receiving cavity 16 so that the foot 19 is supported on the sole structure 18 with the sole structure 18 positioned below the foot 19, and between the foot 19 and an object such as skateboard S in FIGS. 8 and 9 and the ground.

Figure 2:
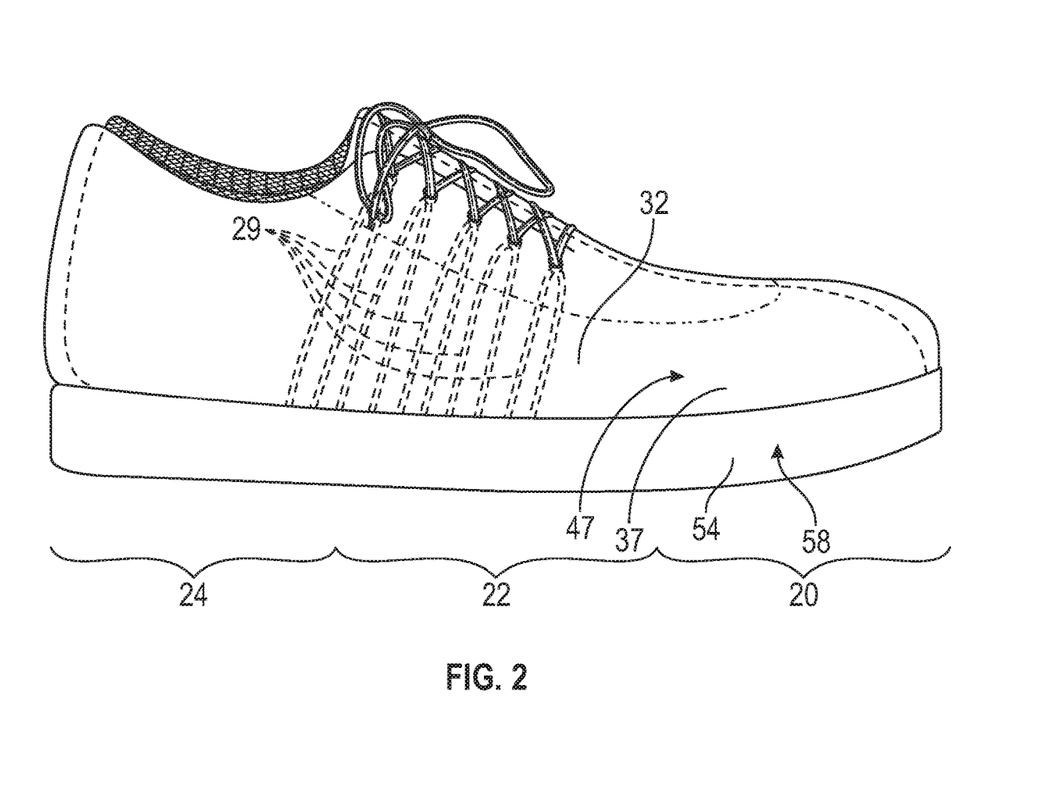
FIG. 2 is a schematic illustration in lateral side view of the article of footwear of FIG. 1.

The article of footwear 10 has a forefoot portion 20, a midfoot portion 22 and a heel portion 24, indicated in FIG. 2. Both the upper 14 and the sole structure 18 extend in and partially define the forefoot portion 20, the midfoot portion 22 and the heel portion 24. The article of footwear 10 has a medial side 30 (FIG. 1) and a lateral side 32 (FIG. 2) opposite from the medial side 30. The medial side 30 and the lateral side 32 extend through each of forefoot region 20, the midfoot region 22, and the heel region 24 and correspond with opposite sides of the article of footwear 10. The forefoot region 20, the midfoot region 22, the heel region 24, the medial side 30 and the lateral side 32 are not intended to demarcate precise areas of footwear 10, but are instead intended to represent general areas of the article footwear 10 to aid in the discussion. The article of footwear 10 shown in configured for a right foot. An article of footwear for a left foot has a mirror image of that shown, and is within the scope of the present teachings.

The upper 14 includes a side portion 34 that has a first material composition at an exterior surface 35 of the side portion 34. The exterior surface 35 has a first coefficient of friction μ. The exterior surface 35 that has the first coefficient of friction $\mu_1$ may be the entire side portion 34, or only selected areas of the side portion 34 may have the exterior surface 35 with the first coefficient of friction $\mu_1$. In the embodiment shown, the entire side portion 34 is of the first material composition and has the exterior surface 35 with the first coefficient of friction $\mu_1$. The side portion 37 at the lateral side 32 also has an exterior surface 47 that has the first coefficient of friction $\mu_1$. It should be appreciated that the exterior surface 47 may be textured, with the texture contributing to the coefficient of friction.

The first material composition may comprise a natural or synthetic rubber, for example. The first material composition is selected to provide the first coefficient of friction $\mu_1$ which is that of a rubber that is sufficiently soft to provide good grip. It should be appreciated that the exterior surface 35 with the first material composition may be textured, with the texture contributing to the first coefficient of friction $\mu_1$.

Figure 5:
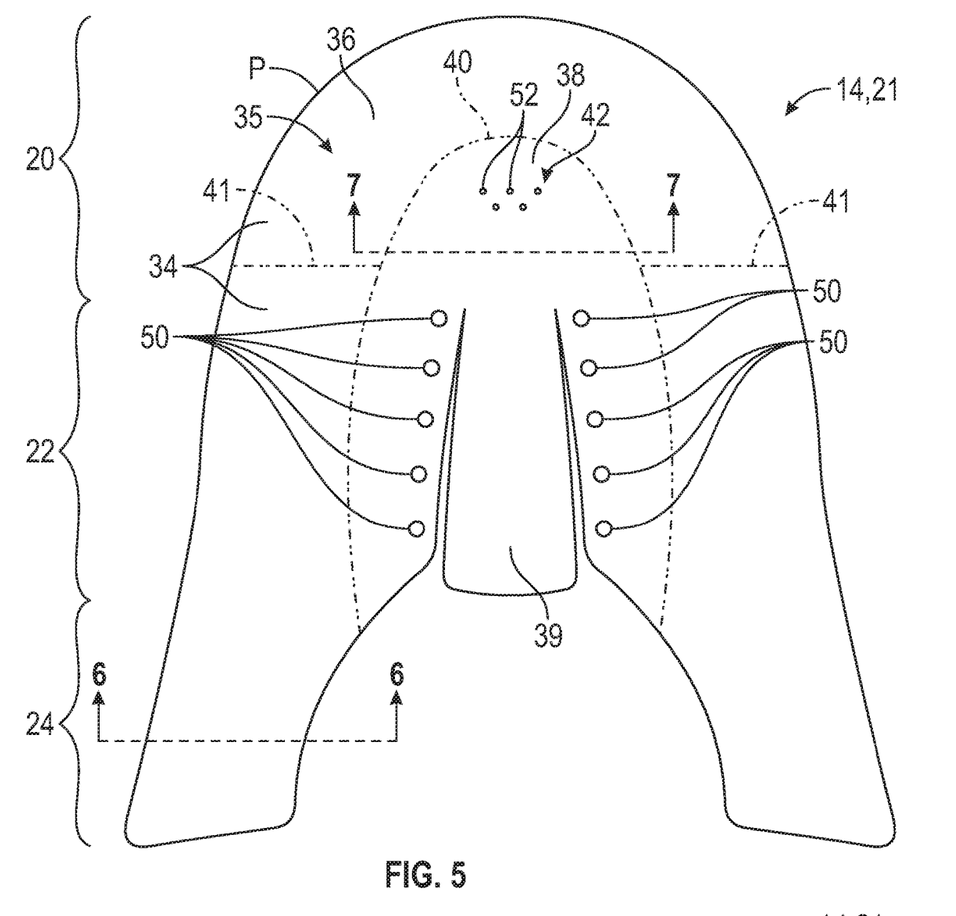
FIG. 5 is a schematic plan view illustration of the outer unit of the upper of FIG. 1 prior to assembly to the sole structure.

The upper 14 includes eyelet openings 50 and ventilation openings 52 that extend entirely through the outer unit 21. For example, as shown in FIG. 5, eyelet openings 50 extend on either side of the tongue 39. Ventilation openings 52 are shown in a vamp region 38, but may instead or in addition be in a toe box region 36, or further rearward in the midfoot region 22 or heel region 24. Accordingly, the first material composition at the exterior surface 35 meets frictional and durability requirements while providing comfort and ventilation of the upper 14. The first composition is not limited to a material that includes rubber, and the upper 14 may be a variety of materials, such as leather, textiles, polymers, cotton, foam, composites, etc., as long as the exterior surface of the sole structure 18 underlying the exterior surface 35 is of a different second material composition.

With reference to FIGS. 1 and 5, the outer unit 21 of the upper 14 has a toe box region 36 and a vamp region 38 contiguous with the toe box region 36. The toe box region 36 is in the forefoot region 20. The vamp region 38 extends in both the forefoot region 20 and the midfoot region 22. With reference to FIG. 1, the toe box region 36 is adjacent to the sole structure 18 and between the sole structure 18 and the vamp region 38. The toe box region 36 is configured to extend over the toes of a wearer and around the front of the toes, as well as on the medial side 30 of the big toe and on the lateral side 32 of the little toe. The toe box region 36 may also be referred to as the toe region.

The vamp region 38 is configured to extend over the instep of the foot 19, and is bounded by the toe box region 36 forward of the vamp region 38, and below the vamp region 38 at the medial side 30 and at the lateral side 32. The vamp region 38 extends rearward from the forefoot region 20 into the midfoot region 22, and includes a tongue 39. A boundary 40 between the vamp region 38 and the toe box region 36 extends around the forefoot region 20 of the upper 14 from the medial side 30 to the lateral side 32. With reference to FIG. 5, the toe box region 36 is bounded by an outer perimeter P of the upper 14, the boundary 40, and a boundary 41 that is generally configured to fall along the metatarsophalangeal joints of the foot 19. The toe box region 36 is entirely in the forefoot region 20.

In the embodiment shown, the toe box region 36 and the vamp region 38 are both of the first material composition. The exterior surface 35 of the side portion 34 is in the toe box region 36. The exterior surface 35 of the side portion 34 is contiguous with an exterior surface 42 of the vamp region 38. The exterior surface 42 of the vamp region 38 also has the first coefficient of friction $\mu_1$.

The sole structure 18 is configured to work in conjunction with the upper 14 to provide a seamless grip at both the exterior surface 35 of the side portion 34 of the upper 14 and the sole structure 18. In one or more embodiments, the sole structure 18 has a side wall 54 as well as a bottom 60. The side wall 54 has an exterior surface 58 that directly underlies the exterior surface 35 of the side portion 34 of the upper 14. The sole structure has a second material composition at the exterior surface 58. The second material composition is different from the first material composition of the upper 14. For example, in the embodiment shown, the second material composition is polymeric foam. Non-limiting examples of materials from which the first material composition and the second material composition may be selected include rubber, a polymeric foam, silicone, thermoplastic polyurethane, polypropylene, polyethylene, ethylvinvlyacetate, and styrene ethylbutylene styrene, for example, and combinations of such, with the first material composition and the second material composition being different, however.

The exterior surface 58 of the sole structure 18 has a second coefficient of friction $\mu_2$. As used herein, the first coefficient of friction $\mu_1$ and the second coefficient of friction $\mu_2$ are dimensionless, and may both be coefficients of static friction, or may both be coefficients of kinetic friction. The first coefficient of friction $\mu_1$ and the second coefficient of friction $\mu_2$ are determined according to the same test, using the same reference object, such as according to any standard ASTM test. Ideally, the first coefficient of friction $\mu_1$ and the second coefficient of friction $\mu_2$ are equal. However, a range of variance is possible due to manufacturing tolerances or otherwise. In all cases, the first coefficient of friction $\mu_1$ is equal or "substantially equal" to the second coefficient of friction $\mu_2$. As used herein, the first coefficient of friction $\mu_1$ is "substantially equal" to the second coefficient of friction $\mu_2$ when the difference between the first coefficient of friction $\mu_1$ and the second coefficient of friction $\mu_2$ is not more than 20 percent of the first coefficient of friction $\mu_1$. Stated differently, the second coefficient of friction $\mu_1$ is within the range from 20 percent less than to 20 percent greater than the first coefficient of friction $\mu_1$. In some embodiments, the difference between the first coefficient of friction $\mu_1$ and the second coefficient of friction $\mu_2$ is not more than 15 percent of the first coefficient of friction $\mu_1$. In some embodiments, the difference between the first coefficient of friction $\mu_1$ and the second coefficient of friction $\mu_2$ is not more than 10 percent of the first coefficient of friction $\mu_1$. In some embodiments, the difference between the first coefficient of friction $\mu_1$ and the second coefficient of friction $\mu_2$ is not more than 5 percent of the first coefficient of friction $\mu_1$. In some embodiments, the difference between the first coefficient of friction $\mu_1$ and the second coefficient of friction $\mu_2$ is not more than 2 percent of the first coefficient of friction $\mu_1$. In some embodiments, the difference between the first coefficient of friction $\mu_1$ and the second coefficient of friction $\mu_2$ is not more than 1 percent of the first coefficient of friction $\mu_1$. Accordingly, the difference between the first coefficient of friction $\mu_1$ and the second coefficient of friction $\mu_2$ can be any one of, but is not limited to, 0%, 1%, 2%, 3%, 4%, 5%, 6%, 7%, 8%, 9%, 10%, 11%, 12%, 13%, 14%, 15%, 16%, 17%, 18%, 19%, and 20%, inclusive of values therebetween.

In the embodiment shown, the entire exterior surface of the side wall 54, including the exterior surface in the forefoot region 20, the exterior surface in the midfoot region 22, and the exterior surface in the heel region 24 and of both the medial side 30 and the lateral side 32 is of the second material composition that has the second coefficient of friction $\mu_2$. Configuring the sole structure 18 so that the side wall 54 has the second coefficient of friction $\mu_2$ enables the entire exposed medial side 30 and the entire exposed lateral side 32 of the article of footwear 10 to present substantially the same coefficient of friction to an object such as a skateboard. Control of a skateboard is illustrated in FIGS. 8 and 9, but it should be appreciated that control of any object may be improved in the same manner as discussed with respect to the skateboard. Although described as an article of footwear 10 for skateboarding, the upper 14 and sole structure 18 are not solely limited to footwear designed for skateboarding, however, and may be incorporated into a wide range of athletic footwear styles, including shoes that are suitable for baseball, basketball, cross-training, football, rugby, soccer, tennis, volleyball, and walking, for example. In addition, the footwear 10 with upper 14 and sole structure 18 as described may be footwear that is generally considered to be non-athletic footwear, including a variety of dress shoes, casual shoes, sandals, and boots.

Surface contact with the exterior surface 35 of the upper 14 will provide the same grip and feel as surface contact with the exterior surface 58 of the side wall 54 of the sole structure 18. Motions in which an object is contacted with the exterior surface 35 of the upper 14 followed by contact with the exterior surface 58 of the side wall 54, or vice versa, can provide identical grip on the object in both phases, allowing movement to be made seamlessly between the two surfaces. For example, control of a skateboard S may be improved due to the nearly identical frictional forces F1, F2 that may result on the exterior surface 35 of the upper 14 and on the exterior surface 58 of the sole structure 18 regardless of whether the skateboard S is in contact with the exterior surface 35 of the upper 14 or is in contact with the exterior surface 58 of the side wall 54. In FIG. 8, the skateboard S is shown simultaneously in contact with both the exterior surface 35 of the upper 14 and the exterior surface 58 of the sole structure 18. Accordingly, control of the skateboard S remains consistent whether the skateboard S is in contact with the upper 14, with the sole structure 18, or with both. During movements in which contact transitions from the upper 14 to the sole structure 18 or vice versa, the force that the wearer must apply to the skateboard to result in a given grip (i.e., a given friction force F1 or F2) remains consistent. For example, the skateboard S may slide across the footwear 10 from the upper 14 to the sole structure 18 or vice versa without any variance in applied force by the wearer required to result in the same frictional force on the skateboard S. In another example, if the skateboard S moves out of contact with the upper 14 and then back into contact with the sole structure 18, or vice versa, the same applied force by the wearer is required to result in the same frictional force on the skateboard S.

Figure 3:
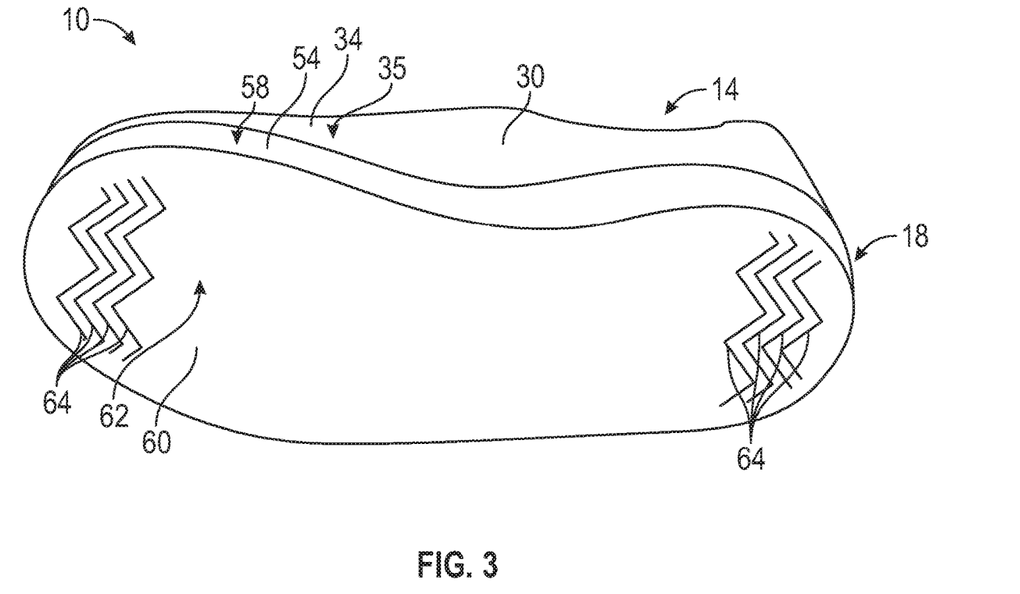
FIG. 3 is a schematic perspective illustration of the article of footwear of FIG. 1 showing a bottom of the sole structure and a medial side of the upper.
Figure 8:
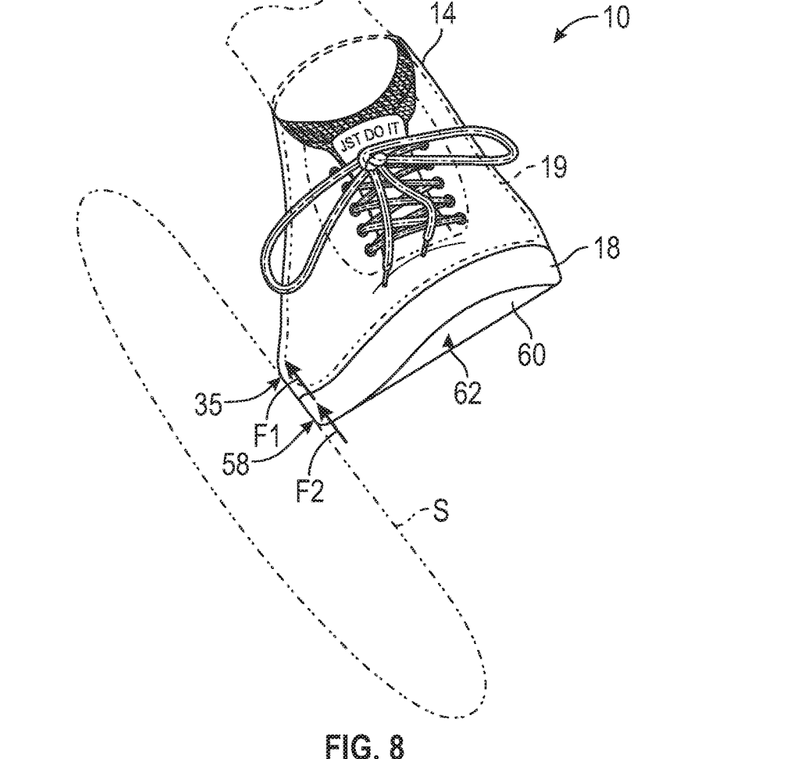
FIG. 8 is a schematic illustration in front perspective view of the article of footwear of FIG. 1 with a side portion of the upper and a sidewall of the sole structure contacting an object shown in phantom.
Figure 9:
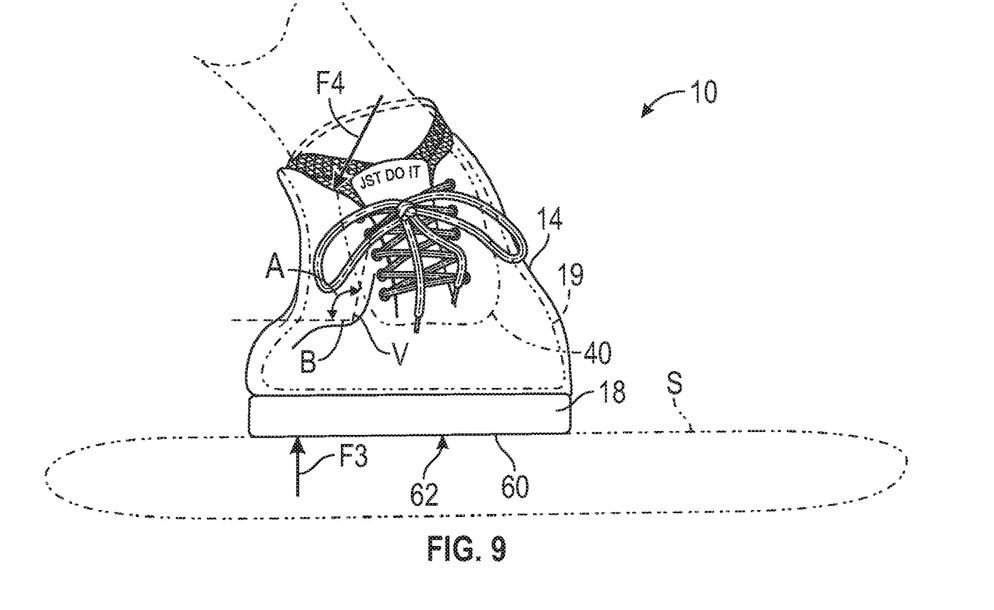
FIG. 9 is a schematic illustration in front perspective view of the article of footwear of FIG. 1 with a bottom of the sole structure contacting the object shown in phantom.

The sole structure 18 also has a bottom 60 with a bottom surface 62 best shown in FIGS. 3 and 8. In the article of footwear shown, the side wall 54 and the bottom 60 form a right angle with one another or an angle within 5 degrees of a right angle. More particularly, the edge of the intersection of the side wall 54 and the bottom 60 may be rounded, but a plane generally coincident with the exterior surface 58 of the side wall 54 and a plane generally coincident with the bottom surface 62 form a right angle or are substantially a right angle, such as within 5 degrees of a right angle. The bottom surface 62 is contiguous with the exterior surface 58 of the side wall 54. As shown in FIG. 3, the bottom surface 62 may include some grooves 64 or siping for increased traction. The bottom 60 is of the same second material composition as the side wall 54 in the embodiment shown, or may be of a different material composition. In either case, the bottom surface 62 may be configured to have the second coefficient of friction, at least in areas between the sipes 64, areas without siping, or in areas where the sipes 64 do not affect the coefficient of friction.

The substantially identical coefficients of friction and the resulting substantially identical frictional forces that may be applied to control the skateboard S are possible even though the upper 14 and the sole structure 18 have different material compositions as may be desirable in order to achieve their respective functions. For example, a polymeric foam of the sole structure 18 provides desired cushioning and durability, while a rubber of the upper 14 is relatively comfortable and flexible. Additionally, the rubber of the upper 14 is sufficiently strong to withstand forces that may be applied by the lace 31 at the lace openings 50, and is easily provided with ventilation openings 52 by molding, piercing, punching, or otherwise.

Figure 4:
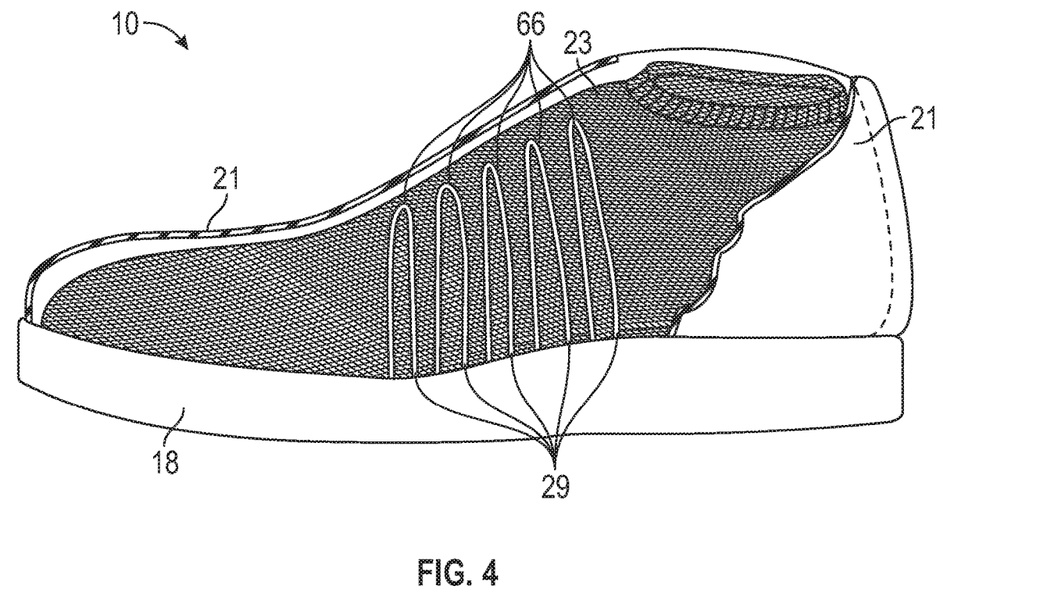
FIG. 4 is a schematic illustration in medial side view of the article of footwear of FIG. 1 showing a partial cut-away of an outer unit of the upper.

As a rubber outer unit 21 is less able to automatically conform to the foot 19 than the inner unit 23, tensioning cables 29 are used to help provide medial and lateral support. The tensioning cables 29 form loops 66 remote from the sole structure 18 as shown in FIG. 4. The tensioning cables 29 are configured with a length such that the loops 66 are disposed adjacent to the eyelet openings 50. The lace 31 may be inserted through the eyelet openings 50 while also passing through the loops 66 so that tightening the lace 31 will simultaneously tighten the outer unit 21 around the foot while tightening the tensioning cables 29 around the foot 19. The separate inner unit 23 is not secured to the inner surface of the outer unit 21, and so can be configured to snugly receive the foot 19. The inner unit 23 in combination with the cables 29 helps to prevent unwanted movement of the foot 19 relative to the sole structure 18 within the foot-receiving cavity 16.

Figure 6:
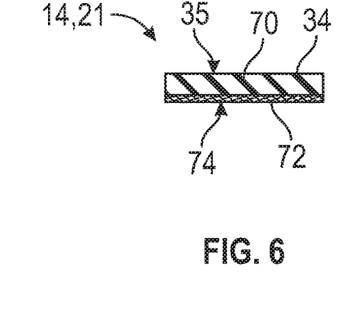
FIG. 6 is a schematic cross-sectional illustration of the outer unit of the upper taken at lines 6-6 in FIG. 5.
Figure 7:
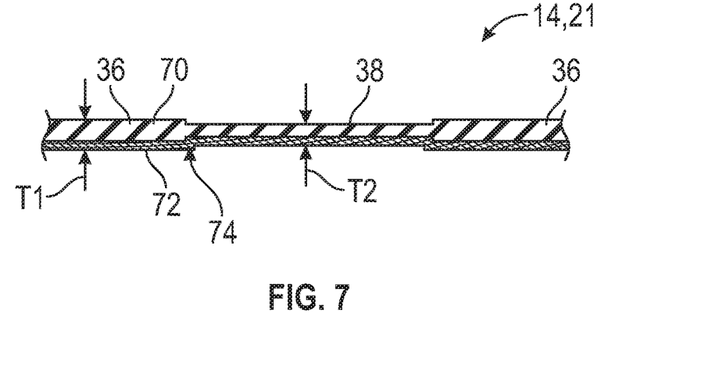
FIG. 7 is a schematic fragmentary cross-sectional illustration of the outer unit of the upper taken at lines 7-7 in FIG. 5.

As best shown in FIGS. 6 and 7, the outer unit 21 of the upper 14 may include an outer layer 70 and an inner layer 72. The outer layer 70 includes the side portion 34 with the exterior surface 35. The inner layer 72 may be secured to an inner surface 74 of the outer layer 70 such as by adhesive or by thermal bonding with or without adhesive. The inner layer 72 may have a third material composition that is softer than the first material composition. For example, the inner layer 72 may be a textile. The inner layer 72 lines the inner surface of the outer layer 70 and presents softer material to be exposed to the inner unit 23 adjacent to the foot 19. Softness may be measured on a hardness scale. For example, softness may be measured according to an ASTM test for Shore A hardness. Generally, softer materials tend to provide a higher coefficient of friction and a corresponding better grip. Materials with a higher surface texture may also provide a higher coefficient of friction.

With reference to FIG. 7, the toe box region 36 has a first thickness T1, and the vamp region 38 has a second thickness T2 less than the first thickness T1. To achieve the different thicknesses, the outer layer 70 may be molded, for example. Accordingly, the thickness T1 of the toe box region 36 is configured to be sufficiently thick so that the toe box region 36 supports and protect the front and sides of the toes of a foot 19 inserted in the foot-receiving cavity 16 of the upper 14. The thickness T2 of the vamp region 38 is configured to be sufficiently thin to encourage flexing and to be well suited for ventilation openings. More specifically, because a thicker component is more difficult to bend than a thinner component of the same material, due to the thickness differential between the toe region 36 and the vamp region 38, the upper 14 may flex at the boundary 40 between the vamp region 38 and the toe box region 36, such as under a force F3 applied to the bottom surface 62 of the sole structure 18 as shown in FIG. 9. FIG. 9 illustrates a bend B of the outer unit 21 at the boundary 40 that occurs under loading by the force F3 and by a force F4 on the outer unit by the foot 19 as the wearer bends at the ankle during a control maneuver. At the bend B, the outer unit 21 buckles or folds slightly over on itself, with a bend angle A having a vertex V at the boundary 40.

Thus, the substantially equal first and second coefficients of friction will provide a skateboarder with improved feel when manipulating a skateboard.

The following Clauses provide example configurations of an article of footwear disclosed herein.

Clause 1: An article of footwear comprising: an upper including a side portion that has a first material composition at an exterior surface of the side portion, the exterior surface having a first coefficient of friction; and a sole structure secured to the upper and having a second material composition at an exterior surface of the sole structure underlying the side portion of the upper, the exterior surface of the sole structure having a second coefficient of friction; wherein the first coefficient of friction is substantially equal to the second coefficient of friction.

Clause 2: The article of footwear of Clause 1, wherein: the sole structure has a side wall; and the exterior surface of the sole structure is at the side wall.

Clause 3: The article of footwear of Clause 2, wherein: the sole structure has a bottom with a bottom surface; the bottom surface is contiguous with the exterior surface of the side wall; and the bottom surface has the second coefficient of friction.

Clause 4: The article of footwear of any of Clauses 1-3, wherein the upper has at least one of eyelet openings or ventilation openings.

Clause 5: The article of footwear of any of Clauses 1-4, wherein the first material composition includes rubber.

Clause 6: The article of footwear of Clause 5, wherein the second material composition includes polymeric foam.

Clause 7: The article of footwear of any of Clauses 1-6, wherein: the upper includes an outer layer and an inner layer; the outer layer includes the side portion with the exterior surface; the inner layer is bonded to an inner surface of the outer layer; and the inner layer has a third material composition that is softer than the first material composition.

Clause 8: The article of footwear of any of Clauses 1-7, wherein: the upper includes an outer unit that has a forefoot region, a midfoot region, a heel region, and the side portion with the exterior surface; and the outer unit is a one-piece, unitary component.

Clause 9: The article of footwear of Clause 8, wherein the upper includes an inner unit disposed inward of the outer unit and defining a foot-receiving cavity; and wherein the outer unit is securable around the foot-receiving cavity separately from the inner unit.

Clause 10: The article of footwear of Clause 9, further comprising: tensioning cables secured to the sole structure and disposed between the outer unit and the inner unit; wherein the outer unit has eyelet openings; and wherein the tensioning cables form loops remote from the sole structure and configured to be disposed adjacent to the eyelet openings.

Clause 11: The article of footwear of any of Clauses 1-10, wherein: the upper has a forefoot region that includes a toe box region and a vamp region contiguous with the toe box region; the toe box region is adjacent to the sole structure and between the sole structure and the vamp region; the toe box region has a first thickness; and the vamp region has a second thickness less than the first thickness.

Clause 12: The article of footwear of Clause 11, wherein a boundary between the vamp region and the toe box region extends around the forefoot region of the upper from a medial side of the upper to a lateral side of the upper.

Clause 13: The article of footwear of Clause 11, wherein: the upper flexes at a boundary between the vamp region and the toe box region under a force applied to a bottom surface of the sole structure.

Clause 14: The article of footwear of Clause 11, wherein the toe box region and the vamp region are both of the first material composition; the exterior surface of the side portion is in the toe box region; the exterior surface of the side portion is contiguous with an exterior surface of the vamp region; and the exterior surface of the vamp region has the first coefficient of friction.

Clause 15: An article of footwear comprising: an upper including a one-piece, unitary outer unit that has a forefoot region, a midfoot region, and a heel region; wherein the outer unit is comprised of rubber and has a side portion with an exterior surface that has a first coefficient of friction; a sole structure secured to the upper; wherein the sole structure is comprised of polymeric foam and has an exterior surface that has a second coefficient of friction and that underlies the exterior surface of the side portion of the outer unit; wherein the first coefficient of friction is substantially equal to the second coefficient of friction; and wherein the forefoot region of the outer unit has a toe box region and a vamp region, the toe box region is adjacent to the sole structure and between the sole structure and the vamp region, the toe box region has a first thickness, and the vamp region has a second thickness less than the first thickness.

Clause 16: The article of footwear of Clause 15, wherein the outer unit has at least one of eyelet openings or ventilation openings.

Clause 17: The article of footwear of any of Clauses 15-16, wherein: a boundary between the vamp region and the toe box region extends around the forefoot region of the outer unit from a medial side of the outer unit to a lateral side of the outer unit; and the upper flexes at the boundary under a force applied to a bottom surface of the sole structure.

Clause 18: The article of footwear of any of Clauses 15-17, wherein: the outer unit includes an outer layer and an inner layer; the inner layer is bonded to an inner surface of the outer layer; the outer layer includes the side portion and the exterior surface; and the inner layer comprises a textile.

Clause 19: The article of footwear of any of Clauses 15-18, further comprising: a bootie disposed inward of the outer unit and defining a foot-receiving cavity; and wherein the outer unit is securable around the foot-receiving cavity separately from the bootie.

Clause 20: The article of footwear of Clause 19, further comprising: tensioning cables secured to the sole structure and disposed between the outer unit and the bootie; wherein the outer unit has eyelet openings; and wherein the tensioning cables form loops remote from the sole structure and configured to be disposed adjacent to the eyelet openings.

To assist and clarify the subsequent description of various embodiments, various terms are defined herein. Unless otherwise indicated, the following definitions apply throughout this specification (including the claims).

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal", as used throughout this detailed description and in the claims, refers to a direction extending a length of a component. For example, a longitudinal direction of a shoe extends between a forefoot region and a heel region of the shoe. The term "forward" is used to refer to the general direction from a heel region toward a forefoot region, and the term "rearward" is used to refer to the opposite direction, i.e., the direction from the forefoot region toward the heel region. In some cases, a component may be identified with a longitudinal axis as well as a forward and rearward longitudinal direction along that axis.

The term "vertical", as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, and may generally point towards the sole, or towards the outermost components of the sole.

The "interior" of an article of footwear, such as a shoe, refers to portions at the space that is occupied by a wearer's foot when the shoe is worn. The "inner side" of a component refers to the side or surface of the component that is (or will be) oriented toward the interior of the shoe in an assembled shoe. The "outer side" or "exterior" of a component refers to the side or surface of the component that is (or will be) oriented away from the interior of the shoe in an assembled shoe. In some cases, the inner side of a component may have other components between that inner side and the interior in the assembled shoe. Similarly, an outer side of a component may have other components between that outer side and the space external to the assembled shoe. Further, the terms "inward" and "inwardly" shall refer to the direction toward the interior of the component or article of footwear, such as a shoe, and the terms "outward" and "outwardly" shall refer to the direction toward the exterior of the component or article of footwear, such as the shoe. In addition, the term "proximal" refers to a direction that is nearer a center of a footwear component, or is closer toward a foot when the foot is inserted in the article as it is worn by a user. Likewise, the term "distal" refers to a relative position that is further away from a center of the footwear component or is further from a foot when the foot is inserted in the article as it is worn by a user. Thus, the terms proximal and distal may be understood to provide generally opposing terms to describe the relative spatial position of a footwear layer.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. An article of footwear comprising:
    an upper including a one-piece, unitary unit that has a forefoot region, a midfoot region, a heel region, and an ankle opening;
    wherein the forefoot region of the unit has a toe box region and a vamp region contiguous with the toe box region, the vamp region extends from the forefoot region to the ankle opening in the midfoot region, the toe box region has a first thickness, and the vamp region has a second thickness less than the first thickness with a step change from the first thickness to the second thickness at a boundary between the vamp region and the toe box region that extends around the forefoot region of the unit from a medial side of the unit to a lateral side of the unit; and
    wherein the step change in thickness is at both an outer side and an inner side of the unit.

2. The article of footwear of claim 1, wherein the second thickness extends from the boundary between the vamp region and the toe box region at the medial side to a terminal edge of the unit at the ankle opening and from the boundary between the vamp region and the toe box region at the lateral side to the terminal edge of the unit at the ankle opening.

3. The article of footwear of claim 1, wherein the unit includes a tongue.

4. The article of footwear of claim 1, wherein the unit has at least one of eyelet openings or ventilation openings.

5. The article of footwear of claim 1, wherein the unit comprises rubber.

6. An article of footwear comprising:
    an upper including a one-piece, unitary unit that has a forefoot region, a midfoot region, a heel region, and an ankle opening;
    wherein the forefoot region of the unit has a toe box region and a vamp region contiguous with the toe box region, the vamp region extends from the forefoot region to the ankle opening in the midfoot region, the toe box region has a first thickness, and the vamp region has a second thickness less than the first thickness with a step change from the first thickness to the second thickness at a boundary between the vamp region and the toe box region that extends around the forefoot region of the unit from a medial side of the unit to a lateral side of the unit;
    wherein the unit includes an outer layer and an inner layer, the inner layer is bonded to an inner surface of the outer layer, and the step change in thickness is at both an outer side and an inner side of the outer layer.

7. The article of footwear of claim 1, wherein the unit is an outer unit, and the article of footwear further comprising:
    an inner unit disposed inward of the outer unit and defining a foot-receiving cavity; and
    wherein the inner unit is not secured to an inner surface of the outer unit.

8. The article of footwear of claim 7, wherein the inner unit is configured as a sock.

9. The article of footwear of claim 7, further comprising:
    tensioning cables disposed between the outer unit and the inner unit.

10. The article of footwear of claim 9, wherein:
    the outer unit has eyelet openings; and
    the tensioning cables form loops configured to be disposed adjacent to the eyelet openings.

11. The article of footwear of claim 1, wherein the unit is an outer unit and includes an outer layer and an inner layer; the inner layer is bonded to an inner surface of the outer layer; and the article of footwear further comprising:
    an inner unit configured as a sock and disposed inward of the inner layer of the outer unit and defining a foot-receiving cavity; wherein the inner unit is not secured to the inner layer of the outer unit.

12. The article of footwear of claim 1, further comprising:
    a sole structure secured to the unit and having a side wall;
    wherein the toe box region is between the side wall and the vamp region in the forefoot region.

13. The article of footwear of claim 12, wherein the sole structure is a single, one-piece, unitary midsole and outsole.

14. The article of footwear of claim 6, wherein the outer layer comprises rubber and the inner layer comprises a textile.

15. An article of footwear comprising:
    an upper including a one-piece, unitary unit that has a forefoot region, a midfoot region, a heel region, and an ankle opening;
    wherein the forefoot region of the unit has a toe box region and a vamp region contiguous with the toe box region, the vamp region extends from the forefoot region to the ankle opening in the midfoot region, the toe box region has a first thickness, and the vamp region has a second thickness less than the first thickness with a step change from the first thickness to the second thickness at a boundary between the vamp region and the toe box region and at both an outer side and an inner side of the one-piece, unitary unit.

16. The article of footwear of claim 15, wherein:
the unit includes an outer layer and an inner layer;
the inner layer is disposed at an inner surface of the outer layer;
the step change in thickness at the outer side of the unit is at the outer side of the outer layer; and
the step change in thickness at the inner side of the unit is at the inner side of the inner layer.

17. The article of footwear of claim 15, wherein:
the unit includes an outer layer and an inner layer;
the inner layer is disposed at an inner surface of the outer layer;
the step change in thickness at the outer side of the unit is at the outer side of the outer layer; and
the inner surface of the outer layer has the step change in thickness.

* * * * *